United States Patent [19]

Salter, Jr. et al.

[11] Patent Number: 4,944,609
[45] Date of Patent: * Jul. 31, 1990

[54] OIL FILM BEARING AND BUSHING

[75] Inventors: Lowell S. Salter, Jr., Shrewsbury; Thomas E. Simmons, Westborough; Charles L. Innis, Jr., Paxton, all of Mass.

[73] Assignee: Morgan Construction Company, Worcester, Mass.

[*] Notice: The portion of the term of this patent subsequent to Sep. 20, 2005 has been disclaimed.

[21] Appl. No.: 246,450

[22] Filed: Sep. 19, 1988

Related U.S. Application Data

[63] Continuation-in-part of Ser. No. 31,422, Mar. 30, 1987, Pat. No. 4,772,137.

[51] Int. Cl.$^5$ .............................................. F16C 32/06
[52] U.S. Cl. ................................. 384/118; 384/120; 384/448
[58] Field of Search ............... 384/120, 118, 448, 291, 384/111, 119

[56] References Cited

U.S. PATENT DOCUMENTS

| | | | |
|---|---|---|---|
| 3,076,524 | 2/1963 | Avallone et al. | |
| 3,726,573 | 4/1973 | Unno | 384/120 |
| 4,567,815 | 2/1986 | Kocher | 384/291 |

Primary Examiner—Lenard A. Footland
Attorney, Agent, or Firm—Samuels, Gauthier & Stevens

[57] ABSTRACT

An oil film bearing for rotatably supporting the journal surface of a rolling mill roll neck on a hydrodynamically maintained oil film. The bearing includes a Bushing having outlets adapted to axially interrupt the load carrying continuity of the oil film by draining oil from the load zone at locations intermediate to the ends of the bushing, thereby subdividing the load zone into at least two axially separated pressure zones. Position sensors are located betwen the pressure zones to monitor the spatial relationship or oil film thickness between the bushing and the journal surface. The journal surface is defined by at least two sleeve segments received on and fixed relative to the roll neck. Adjacent ends of the sleeve segments are aligned radially or in a coplanar relationship with the axial separation between the pressure zones. Temperature sensors monitor the temperature of the oil being drained through the aforesaid outlets.

10 Claims, 6 Drawing Sheets

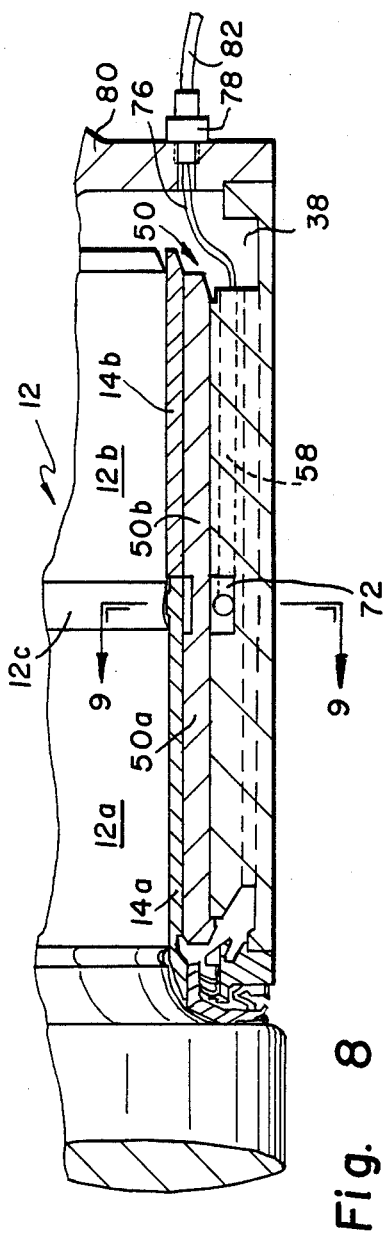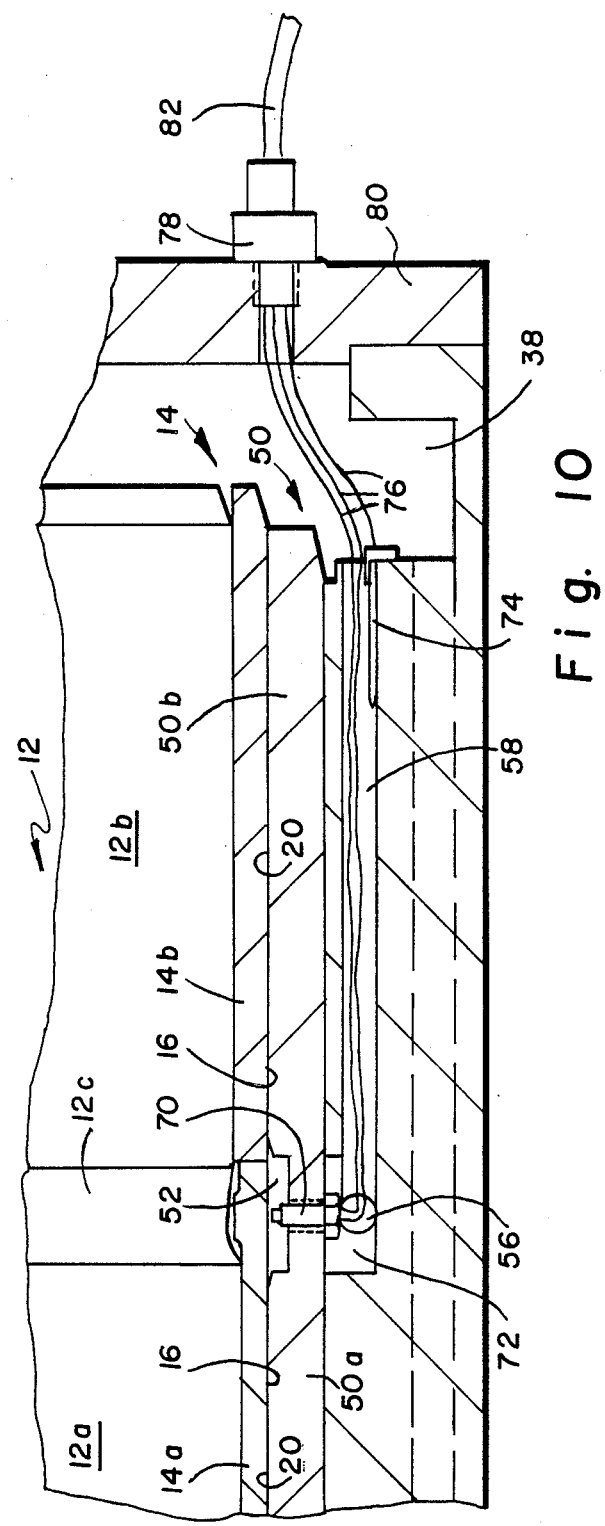

4,944,609

OIL FILM BEARING AND BUSHING

REFERENCE TO RELATED APPLICATION

This application is a continuation-in-part of copending application Ser. No. 07/031,422 filed Mar. 30, 1987, now U.S. Pat. No. 4,772,137.

BACKGROUND OF THE INVENTION

1. Field of the Invention

This invention relates to an improvement in oil film bearings of the type employed to rotatably support the journal surfaces of roll necks in a rolling mill.

2. Description of the Prior Art

In the typical rolling mill oil film bearing, as depicted somewhat diagrammatically in FIGS. 1 and 2, the roll 10 has a neck section 12. The neck section 12 may be conical, as shown in FIG. 1, or it may be cylindrical. A sleeve 14 is received on and fixed relative to the neck section 12. The exterior of the sleeve defines the journal surface 16 of the roll neck. A bushing 18 has an internal bearing surface 20 surrounding and rotatably supporting the journal surface 16. The bushing is contained by and fixed within a chock 22. The chock is closed at the outboard end by an end plate 24 and cover 26. A seal assembly 28 is provided between the roll and the inboard end of the chock 22.

During normal operation of the mill, when the roll is rotating at adequate speeds for full hydrodynamic operation, a continuous flow of oil is fed through one of the sets of passageways 29 in the chock, feed openings 30 in the bushing and rebores 32 in the bearing surface 20. From here, the oil enters between the bearing surface 20 and the rotating journal surface 16 to form a hydrodynamically-maintained somewhat wedge-shaped oil film 34 at the bearing load zone "Z". The load zone is located on the side opposite to that of the load "L" being applied to the roll, and the pressure profile at the load zone is schematically depicted in FIG. 1 at "P".

Although not shown, it will be understood that in most cases conventional hydrostatic means are employed to create the necessary oil film between the journal and bearing surfaces when the roll is either not rotating or rotating at a speed slower than that required to create and maintain the hydrodynamic oil film 34.

Oil is continuously drained from between the journal and bearing surfaces 16,20 at both the inboard and outboard ends of the load zone. The oil draining from the inboard end enters an inboard sump 36 enclosed by the seal assembly 28 and the adjacent surfaces of the chock, bushing and roll. Oil draining from the outboard end enters an outboard sump 38 enclosed by the end plate 24 and chock 22. The sumps 36,38 are interconnected by one or more passageways 40 drilled through the chock, and the outboard sump 38 is connected to a conventional lubrication system (not shown) which filters, cools and recirculates the oil back to the bearing for reintroduction between the bearing and journal surfaces 16,20.

It is to be understood that as herein employed, the term "oil" is to be interpreted broadly to include all classes of lubricants employed in bearings of the type under consideration, including for example mineral oil, synthetic oils and mixtures of oils and oil additives.

One of the objectives of the present invention is to achieve an increase in the stiffness of the above described oil film bearing. As herein employed, the term "stiffness" means the ability of the bearing to resist movement of the journal surface 16 relative to the bearing surface 20 in response to the application of the load L to the roll.

Another objective of the present invention is to reduce operating temperatures retained on the roll neck by an interference fit, e.g., by increasing the volume of oil flowing through the bearing. A companion objective is to achieve a reduction in the volume of oil draining into the inboard sump 36, thereby lessening the possibility of oil being lost through the seal assembly 28 as it undergoes normal wear.

Another objective of the present invention is to improve the ability of the bushing and chock to self-align themselves with respect to the journal surface of the sleeve as the roll undergoes deflection during loading.

Another objective of the present invention is to employ multiple axially aligned sleeves which are retained on the roll neck by an interference fit, e.g., by heat shrinking or pressing onto the roll neck.

Still another objective of the present invention is to provide improved means for monitoring the thickness of the hydrodynamically-maintained oil film by measuring the spatial relationship between the journal and bearing surfaces at the center of the load zone.

A still further objective of the present invention is to provide an improved means for monitoring oil temperature at the center of the load zone.

SUMMARY OF THE INVENTION

The foregoing objectives and advantages are achieved by employing a novel bushing and bearing assembly adapted to interrupt the load carrying continuity of the hydrodynamically maintained oil film in a manner which causes the load zone to be axially subdivided into compound pressure zones. The maximum pressure developed at each compound pressure zone is greater than that of the conventional unitary pressure zone Z shown in FIG. 1, with the result that the overall stiffness of the bearing is increased.

In several embodiments of the invention to be described hereinafter in greater detail, the bushing has two wall sections defining cylindrical axially aligned internal bearing surfaces on which portions of the hydrodynamically maintained oil film are carried at the load zone. Oil is supplied continuously to the load zone via inlet means including feed openings in each of the internal bearing surfaces, and is removed continuously from opposite ends of the load zone as well as via outlet means axially interposed between the internal bearing surfaces. The feed openings and the outlet means are isolated one from the other by intervening portions of the cylindrical internal bearing surfaces.

The outlet means preferably includes an axial space between the internal bearing surfaces. Preferably the two wall sections of the bushing are integrally joined by an intermediate web of reduced thickness to provide a unitary wall component, and the axial space between the internal bearing surfaces is constituted by a groove on the interior of the wall component.

Alternatively, the two wall sections may be separate one from the other, with the axial space between the internal bearing surfaces constituting part of an axial separation therebetween.

In order to maintain a higher maximum pressure at each of the compound pressure zones, the volume of oil flowing through the bearing is increased. This increased oil flow removes more heat from the bearing and thus produces a beneficial lowering of operating temperatures.

Preferably, the oil being removed from the load zone by the outlet means is drained back through the bearing chock to the outboard bearing sump. This lessens the amount of oil draining into the inboard bearing sump, and thus decreases the possibility of oil being lost through the neck seal as it undergoes normal wear.

The outlet means is preferably located at the bearing center, thereby subdividing the load zone into two identical compound pressure zones. The identical compound pressure zones create counteracting moments axially spaced equal distances from the bearing center, thereby enhancing the self-alignment capabilities of the bearing. Alternatively, the outlet means may be located off-center to provide unequal pressure zones designed to exert a resultant moment in opposition to external bending forces being applied to the roll.

In another embodiment of the invention, the journal surface is defined by two axially aligned sleeve segments retained by an interference fit on the roll neck. This eliminates the need for keys or other like mechanically interengaged sleeve fixing devices. The adjacent ends of the sleeve segments are located at the division between the compound pressure zones, where oil pressures are at a minimum. This safeguards the sleeves from being axially dislodged by the substantially higher oil pressure being maintained within the compound pressure zones during mill operation.

The division between the compound pressure zones also provides an ideal site for locating position sensors to monitor the spatial relationship between the journal and bearing surfaces, thereby providing an accurate and direct measurement of the thickness of the hydrodynamically maintained oil film.

Temperature sensors are employed to monitor the temperature of the oil exiting from the bearing center via the outlet means. This provides a further indication of conditions at the bearing center.

BRIEF DESCRIPTION OF THE DRAWINGS

FIG. 8 is a partial longitudinal sectional view of a bearing illustrating other features of the invention;

FIG. 10 is an enlarged partial longitudinal section taken along line 10—10 of FIG. 9.

DETAILED DESCRIPTION OF THE INVENTION

Figure 1:
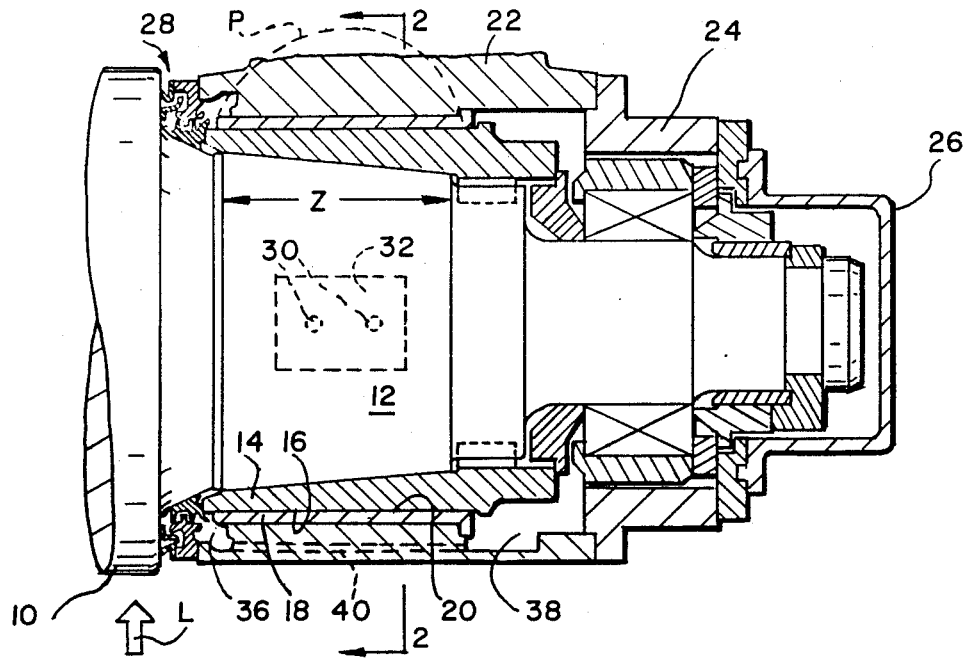
FIG. 1 is a somewhat schematic longitudinal sectional view taken through a conventional rolling mill oil film bearing.
Figure 2:
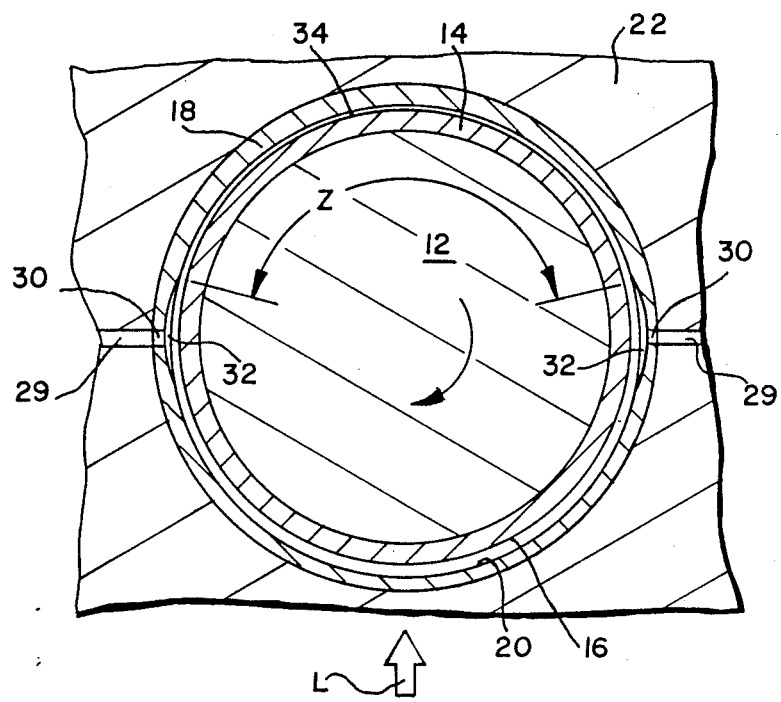
FIG. 2 is a cross sectional view on an enlarged scale taken alone line 2—2 of FIG. 1, with the clearance between the journal and bearing surfaces exaggerated for purposes of illustration.

Several preferred embodiments of a bushing and bearing assembly in accordance with the present invention are depicted in FIGS. 3–10, where features common to those of the prior art bearing assembly illustrated in FIGS. 1 and 2 have been identified by the same reference numerals. Referring initially to FIGS. 3–6, the bushing 50 includes two wall sections 50a, 50b defining cylindrical axially aligned internal bearing surfaces 20a, 20b on which portions of the hydrodynamically maintained oil film are carried at the bearing load zone. As shown in FIG. 4B, oil is admitted between the journal surface 16 and the bearing surface 20b via inlet means comprising one of the two sets of passageways 29 in the chock, feed openings 30 extending through the bushing wall section 50b, and rebores 32 in the bearing surface 20b. Although not shown, it will be understood that identical sets of passageways 29, feed openings 30 and rebores 32 are associated with the bearing surface 20a.

As with the prior art design, oil is removed from the ends of the load zone directly into the inboard and outboard sumps 36,38. Additionally, however, oil also is removed from the load zone via an outlet means located between the internal bearing surfaces 20a, 20b. In the bushing embodiment illustrated in FIGS. 3–5, the two wall sections 50a, 50b are integrally joined by an intermediate web 50c, and the outlet means includes a groove 52 in the web defining an axial space "s" between the internal bearing surfaces 20a, 20b.

Each of the feed openings 30 and rebores 32 is isolated from the groove 52 by intervening portions 20a',20b' of the internal bearing surfaces, thus preventing the incoming oil from escaping directly to the groove 52 without first being directed to the load zone.

Figure 4B:
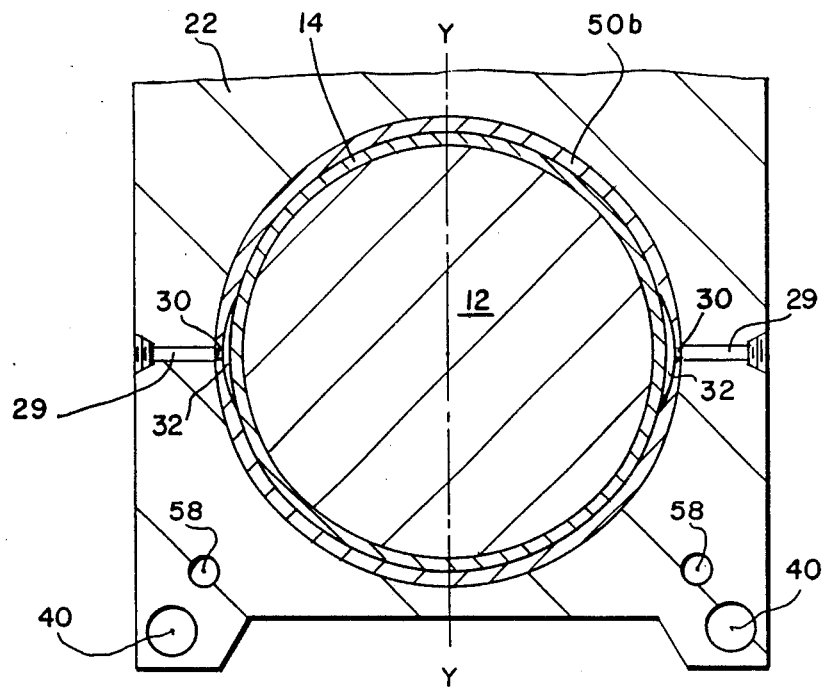
FIGS. 4A and 4B are cross sectional views on an enlarged scale taken along lines 4A—4A and 4B—4B of FIG. 3, again with certain dimensions exaggerated for purposes of illustration.
Figure 4A:
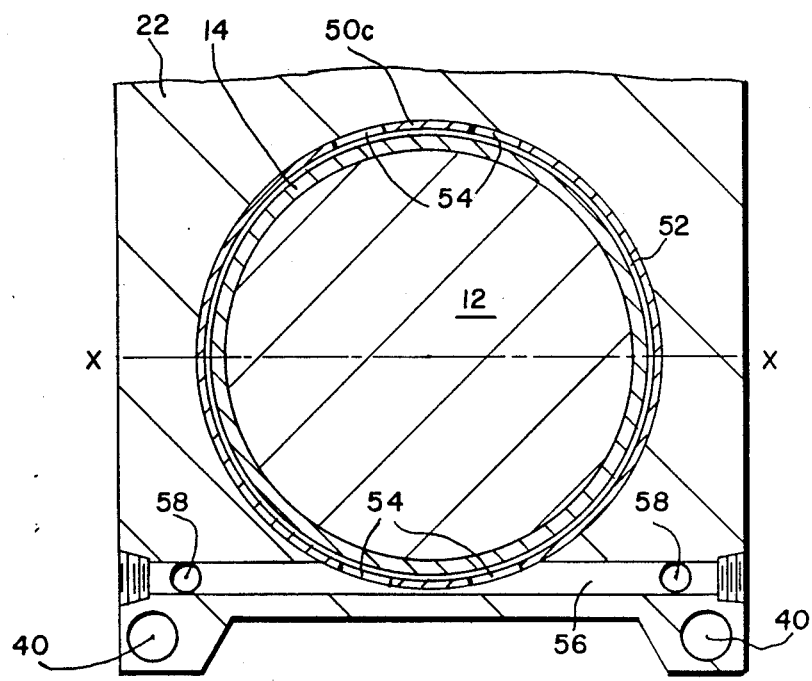
Figure 5:
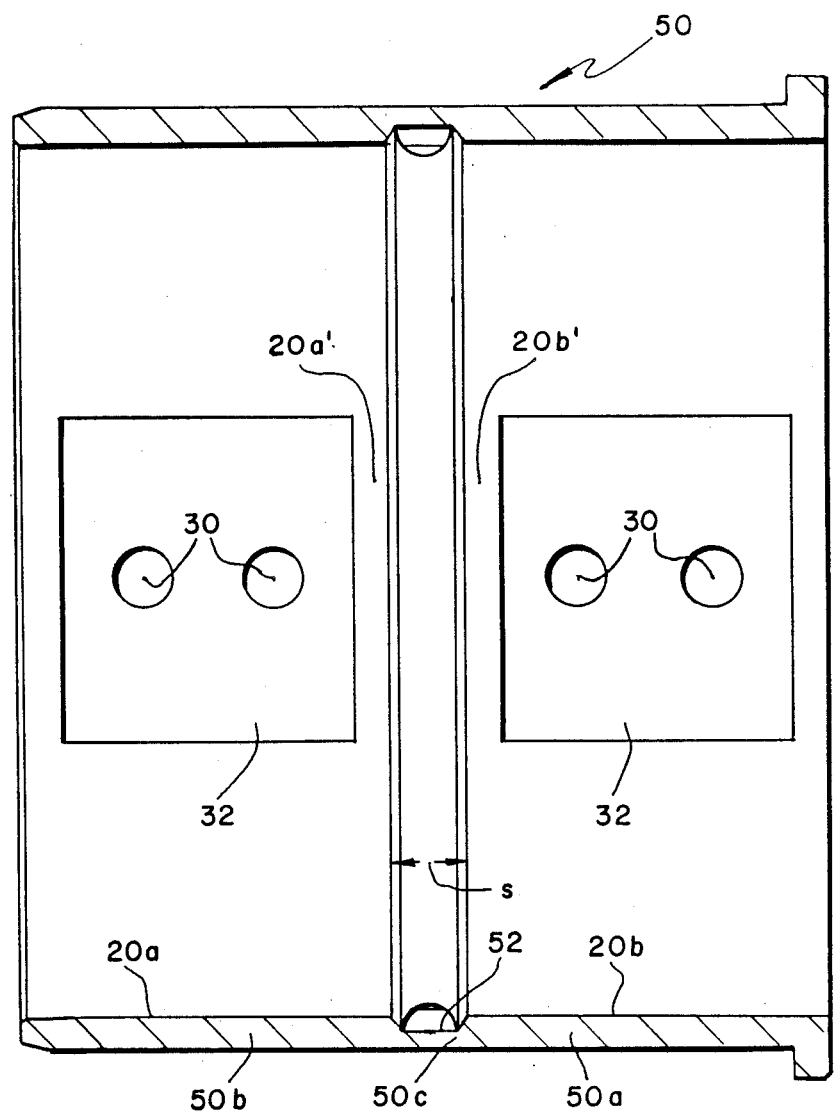
FIG. 5 is a longitudinal sectional view taken through the bushing shown in FIGS. 3 and 4.

As can be best seen in FIG. 4A, the web 50c has drain openings 54 communicating with a cross bore 56 in the chock 22. The cross bore 56 is connected via passageways 58 to the outboard sump 38.

Figure 3:
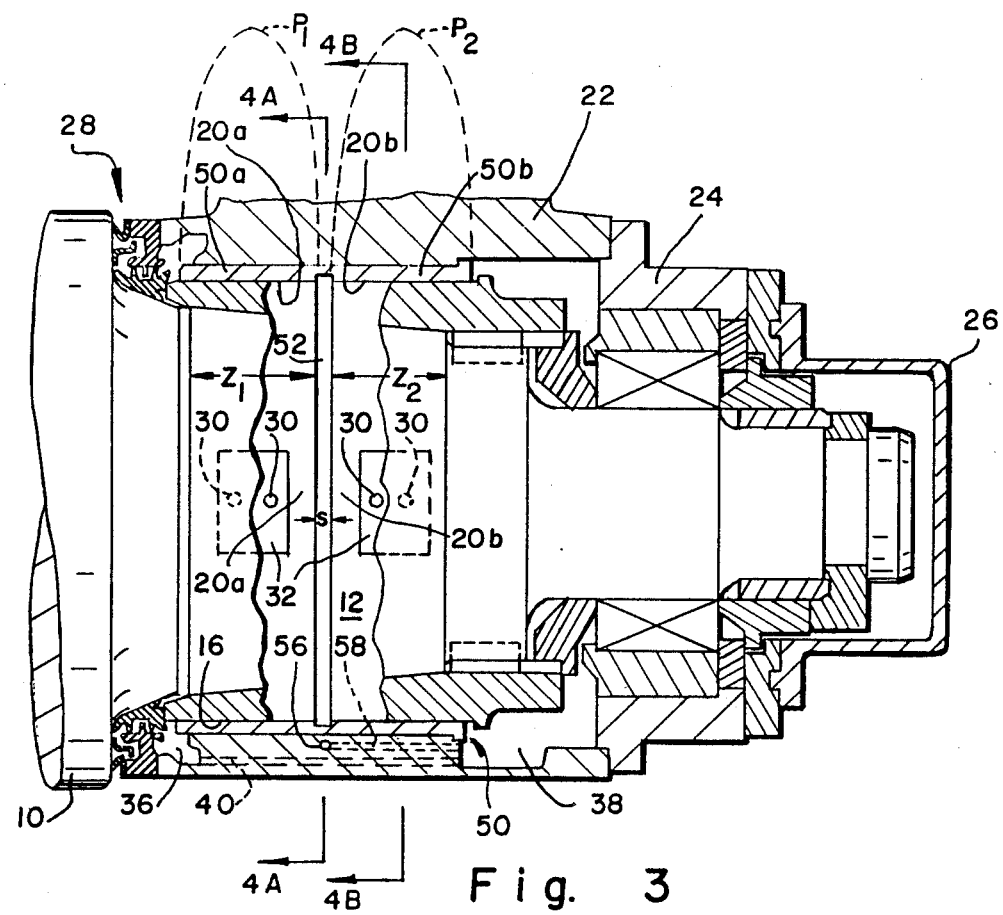
FIG. 3 is another somewhat schematic longitudinal sectional view taken through a rolling mill oil film bearing assembly and bushing in accordance with a first embodiment of the present invention.
Figure 6:
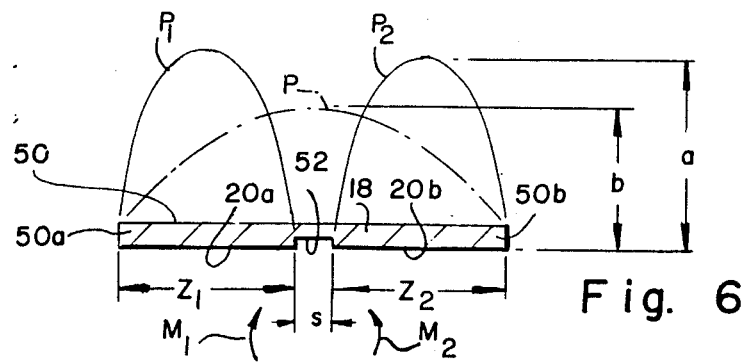
FIG. 6 is a schematic illustration comparing the pressure profiles of the compound pressure zones of a bushing in accordance with the present invention with the pressure profile of the unitary pressure zone of a conventional bushing.

The groove 52 axially subdivides the load zone into compound zones $z_1$, $z_2$, each respectively having pressure profiles schematically depicted at "$P_1$" and "$P_2$" in FIGS. 3 and 6. As shown in FIG. 6, the maximum pressure "a" developed in each pressure zone $z_1$, $z_2$ is greater than the maximum pressure "b" developed in the conventional undivided load zone. This produces a beneficial increase in bearing stiffness.

Again as shown in FIG. 6, twin pressure profiles $P_1$, $P_2$ produce equal opposing moments $M_1$, $M_2$ which act on opposite sides of the bearing center to improve the self-aligning capabilities of the bearing.

In order to maintain these higher pressures, the volume of oil flowing through the bearing must be increased by as much as 20% as compared to the oil flow through a comparable conventional bearing. This increased oil flow removes more heat from the bearing and thus produces significantly lower operating temperatures.

Oil is continuously drained from both pressure zones $z_1$, $z_2$ into the groove 52. From here, the oil progresses through the drain openings 54, cross bore 56 and passageways 58 back to the outboard sump 38, which also receives oil from the outboard end of pressure zone $z_2$. In addition, oil draining from the inboard end of pressure zone $z_1$ into the inboard sump 36 also is directed back to the outboard sump 38 via passageways conduits 40.

With this arrangement, although total oil flow through the bearing is increased, the amount of oil being drained into the inboard sump 36 is actually decreased by approximately 40%. Thus, potential oil loss occasioned by wear of the seal assembly 28 is significantly minimized.

As can be best seen in FIGS. 4A and 4B, the groove 52 preferably extends a full 360° around the bushing axis, with alternatively usable sets of drain openings 54 located on opposite sides of a horizontal reference plane "x—x", and with alternatively usable sets of inlet openings 30 and rebores 32 located on opposite sides of a vertical reference plane "Y—Y". This allows the bushing to be rotated 180° after one side has become worn.

In light of the foregoing, it will now be appreciated by those skilled in the art that various changes and modifications may be made to the foregoing without departing from the basic concepts of the invention. For example, the disruption in the load carrying continuity of the hydrodynamically maintained oil film might be achieved by locating the groove in the journal surface 16 rather than in the bearing surface 20 as herein illustrated. More than one groove might be employed to axially subdivided the bearing into more than two pressure zones.

Also, the groove need not be located at the bearing center. In some cases, it might be advantageous to locate the groove slightly off-center to unbalance the resulting moments $M_1$, $M_2$ and thereby create a resultant moment tending to oppose external bending forces being applied to the roll.

Figure 7:
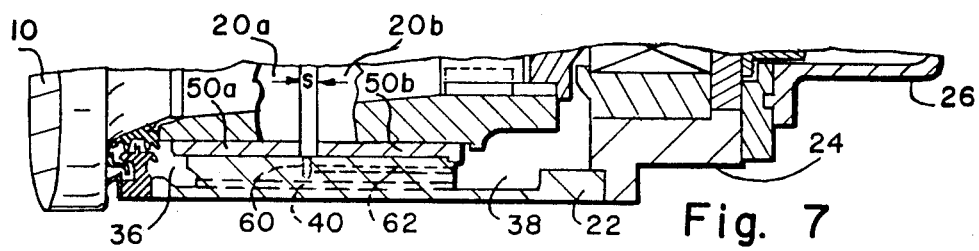
FIG. 7 is a partial longitudinal sectional view of another bearing embodying an alternate embodiment of a bushing in accordance with the present invention.

As shown in FIG. 7, the spacing "s" between bearing surfaces 20a, 20b might be achieved by physically separating the two wall sections 50a, 50b, and by draining oil from the load zone via radial passage 60 and connecting passage 62 leading to the outboard sump 38.

Figure 9:
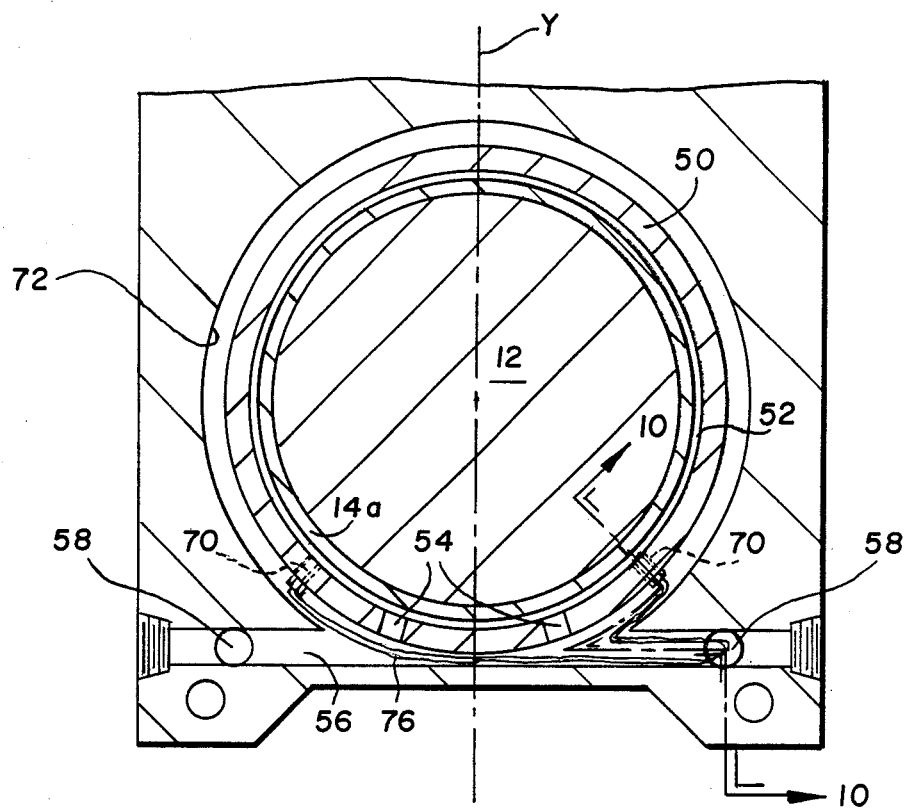
FIG. 9 is a cross sectional view of the entire bearing assembly taken along line 9—9 of FIG. 8.

In FIGS. 8-10, the roll neck 12 is cylindrical, with first and second axially aligned sections 12a, 12b separated by a circular groove 12c. The diameter of neck section 12a is slightly larger than that of section 12b. The sleeve 14 is subdivided into two cylindrical sleeve segments 14a, 14b received respectively on the neck sections 12a, 12b. The external journal surfaces 16 of the sleeve segments 12a, 12b have the same outer diameter, but the internal diameter of sleeve segment 14a is again slightly larger than that of sleeve segment 14b. Preferably, the sleeve segments are rotatably and axially fixed on the roll neck by being heat shrunk onto their respective neck sections, thus eliminating any need for keys or other like means of mechanical interengagement.

The bushing 50 is identical to that illustrated in FIGS. 3-6. Thus, the external journal surfaces 16 of the sleeve segments 14a, 14b are surrounded by the internal bearing surfaces 20 of the bushing wall sections 50a, 50b. The adjacent inner ends of the sleeve segments are arranged in a closely adjacent or abutting relationship at a location aligned radially with the groove 52 separating the bearing surfaces 16,16. Oil pressure at the groove 52 is substantially below that at the compound pressure zones schematically depicted at $P_1$, $P_2$ in FIG. 8. Thus, should there be a gap between the inner ends of the sleeve segments, the sleeve segments will not be in danger of being hydraulically dislodged from their respective neck sections during operation of the mill.

The low pressure area defined at the groove 52 provides an excellent site for locating one or more position sensors 70 to monitor the spatial relationship between the journal and bearing surfaces 16,20 and hence the thickness of the oil film being hydrodynamically maintained therebetween within the pressure zones $P_1$, $P_2$. Preferably, as can be best seen in FIG. 9, at least two position sensors 70 are offset angularly from a vertical reference plane "Y" passing through the bearing center. Space for the position sensors is provided by a circular groove 72 in the chock. Groove 72 communicates with the cross bore 56, which in turn is connected by passageways 58 to the outboard sump 38.

Typically, the position sensors 70 will comprise gap to voltage transducers. Such transducers are used to measure distance, and change in distance, to any conductive material, e.g., the adjacent journal surface 16 of sleeve segment 14a, which is preferably elongated to extend across substantially the entire axial space defined by groove 52.

The connecting web defining the base of groove 52 is again provided with drain openings 54 through which oil is drained from the center of the bearing into the cross bore 56. From here, the oil is directed via the passageways 58 back to the outboard sump 38.

A temperature probe 74, which can comprise a thermocouple or resistance temperature device, is located in one of the passageways 58. Probe 74 monitors the temperature of the oil exiting from the bearing center, before that oil is mixed with oil draining from the bearing ends into the outboard sump 38. The electrical leads 76 for the position transducers 70 and the temperature probe 74 extend across the outboard sum 38 to a common quick disconnect electrical coupling 78 in the bearing end plate 80. A common external electrical line 82 carries the signals generated by the transducers and temperature probe to a mill control center (not shown).

The location of the position transducers 70 at the bearing center line is advantageous in that this is the location at which roll positioning devices, e.g., mechanical screwdowns, hydraulic cylinders, etc. (not shown) act on the roll chocks to control roll parting. The position transducers provide a means of directly measuring the thickness of the hydrodynamically maintained oil film between the journal and bearing surfaces, while the mill is in operation. This eliminates the need for relying on conventional mathematical models which predict oil thickness as a function of variables such as mill speed, load, bearing size, etc. Location of the position transducers at the bearing center also eliminates or at least substantially minimizes errors created by bearing misalignment or chock tilting.

By monitoring the temperature of the oil exiting from the bearing center, the mill operator is able to more accurately anticipate potential problems, e.g., erosion of bearing surfaces, inadequate cooling of incoming oil, etc., and to perform needed maintenance in a timely fashion.

We claim:

1. An oil film bearing for a rotating roll neck in a rolling mill, said bearing comprising: means defining a journal surface of the roll neck; a bushing having a cylindrical internal bearing surface surrounding said journal surface, said bushing being contained by and fixed within a bearing chock; inlet means for introducing a continuous flow of oil between said journal surface and said bearing surface at locations which allow the thus introduced oil to be formed hydrodynamically by the rotary motion of said journal surface relative to said bearing surface into an oil film on which the journal surface is carried at a load zone on one side of the bearing; outlet means for continuously removing oil from said load zone at a location intermediate to the ends of said bushing, thereby providing an interruption in the load carrying continuity of the hydrodynamically formed oil film and separating said load zone into compound pressure zones; and position sensing means located between said compound pressure zones for monitoring the spatial relationship of said journal surface to said bearing surface at said load zone.

2. The oil film bearing of claim 1 wherein said outlet means includes a circular groove in said bearing surface, and wherein said position sensing means is arranged in said groove.

3. The oil film bearing of claim 2 further comprising temperature sensing means for monitoring the temperature of oil being removed from said load zone via said groove.

4. The oil film bearing of claims 1 or 2 wherein said position sensing means comprises a plurality of gap to voltage transducers angularly spaced one from the other.

5. The oil film bearing of claims 1 or 2 wherein said position sensing means comprises at least one gap to voltage transducer.

6. An oil film bearing for a rotating roll neck in a rolling mill, said bearing comprising: sleeve segments received on and fixed relative to the roll neck for rotation therewith, said sleeve segments being aligned axially to define a cylindrical journal surface of the roll neck and having adjacent ends located intermediate the ends of said journal surface; a bushing having a cylindrical internal bearing surface surrounding said journal surface, said bushing being contained by and fixed within a bearing chock; inlet means for introducing a continuous flow of oil between said journal surface and said bearing surface at locations which allow the thus introduced oil to be formed hydrodynamically by the rotary motion of said journal surface relative to said bearing surface into an oil film on which the journal surface is carried at a load zone on one side of the bearing; and outlet means for continuously removing oil from said load zone at a location intermediate to the ends of said bushing and aligned radially with the adjacent ends of said sleeve segments, thereby providing an interruption in the load carrying continuity of the hydrodynamically formed oil film and separating said load zone into compound pressure zones.

7. The oil film bearing of claim 6 wherein said outlet means includes a circular groove in said bearing surface surrounding the adjacent ends of said sleeve segments.

8. The oil film bearing of claim 7 wherein said groove extends axially beyond the adjacent ends of said sleeve segments to surround at least a portion of said journal surface.

9. The oil film bearing of claim 8 further comprising position sensing means located in said groove for monitoring the spatial relationship of the said portion of said journal surface to said bearing surface.

10. The oil bearing of claim 8 wherein said position sensing means comprises at least one gap to voltage transducer aligned radially with the said portion of said journal surface.

* * * * *